(12) United States Patent
Sambin

(10) Patent No.: US 7,751,831 B2
(45) Date of Patent: *Jul. 6, 2010

(54) METHOD OF TRANSMITTING CELLULAR TELEPHONE LOCATION DATA

(75) Inventor: Marco Sambin, Turin (IT)

(73) Assignee: Telecom Italia S.p.A., Milan (IT)

( * ) Notice: Subject to any disclaimer, the term of this patent is extended or adjusted under 35 U.S.C. 154(b) by 889 days.

This patent is subject to a terminal disclaimer.

(21) Appl. No.: 11/505,226

(22) Filed: Aug. 16, 2006

(65) Prior Publication Data
US 2006/0276203 A1 Dec. 7, 2006

Related U.S. Application Data

(63) Continuation of application No. 10/473,616, filed as application No. PCT/EP02/03592 on Mar. 30, 2002, now Pat. No. 7,110,776.

(30) Foreign Application Priority Data
Mar. 30, 2001 (IT) ............ TO2001A0296

(51) Int. Cl.
*H04W 24/00* (2009.01)
(52) U.S. Cl. .......... 455/456.1; 455/414.1; 455/414.2; 455/418; 455/432.1; 455/434; 455/436; 455/456.2; 455/456.3; 455/456.5; 455/456.6; 455/466; 370/310.2; 370/312; 370/328; 370/329
(58) Field of Classification Search ............ 455/414.1, 455/414.2, 418, 432.1, 434, 435.1, 436, 456.1–457, 455/466; 370/310.2, 312, 328, 329
See application file for complete search history.

(56) References Cited
U.S. PATENT DOCUMENTS
6,052,597 A * 4/2000 Ekstrom ............ 455/456.3
6,097,958 A 8/2000 Bergen
6,097,961 A * 8/2000 Alanara et al. ............ 455/466

(Continued)

FOREIGN PATENT DOCUMENTS
EP 0767594 * 4/1997

(Continued)

OTHER PUBLICATIONS

English Translation of JP Office Action dtd May 30, 2007, JP Appln. 577475-2002.

*Primary Examiner*—Stephen M D'Agosta
(74) *Attorney, Agent, or Firm*—Banner & Witcoff, Ltd.

(57) ABSTRACT

In cellular telephony mobile equipment location-based services data transmission an application carries out measures on Base Transceiver Stations or associated cells by detecting, storing and transmitting respective information to a remote Service Center by means of messages, and a processing system, applying calculation procedures and a Base Transceiver Stations geographic position database, computes data associated with the location-based services. In the application at least one message is generated containing a set of data in compressed format, the set of data being selected from a set comprising specific data on each single message, specific data on the message set, specific data on measurements and specific data on the cells monitored by the mobile equipment. The dimensions of the specific data on the measurements generated in compressed format depend on results of the measurements made at a current instant and those obtained at an earlier time.

10 Claims, 5 Drawing Sheets

| Relative intensity of the neighbouring cell signal (5 bit) | ARFCN- BSIC cache index (3 bit) |
|---|---|
| ARFCN (bit 9,8,7...2) ||
| ARFCN (bit 1,0) | BSIC (6 bit) |
| Absolute intensity of the neighbouring cell signal ||

U.S. PATENT DOCUMENTS

| | | | |
|---|---|---|---|
| 6,393,292 B1 * | 5/2002 | Lin | 455/456.5 |
| 6,526,267 B1 * | 2/2003 | Jokimies et al. | 455/161.1 |
| 6,539,229 B1 * | 3/2003 | Ali | 455/456.1 |
| 6,564,064 B1 | 5/2003 | Ciganer et al. | |
| 6,611,688 B1 | 8/2003 | Raith | |
| 6,694,142 B1 | 2/2004 | Kuwahara et al. | |
| 6,708,033 B1 * | 3/2004 | Linkola et al. | 455/440 |

FOREIGN PATENT DOCUMENTS

| | | |
|---|---|---|
| EP | 0930513 A2 | 7/1999 |
| JP | 4200032 | 7/1992 |
| JP | 11275642 | 10/1999 |
| JP | 2000078667 | 3/2000 |

* cited by examiner

| MCC High Byte | MCC Low Byte | MNC | LAC High Byte | LAC Low Byte | CellID Byte | CellID Byte |
|---|---|---|---|---|---|---|
| | | | | | | |

FIG.1 PRIOR ART

|   8   |   7   |   6   |   5   |   4   |   3   |   2   |   1   |
|---|---|---|---|---|---|---|---|
| colspan="8" | Measurement Results IEI | | | | | | | OSTET 1
| BA-USED | DTX USED | colspan="6" | RXLEV-FULL-SERVING-CELL | | | | | | OSTET 2
| O spare | MEAS VALID | colspan="6" | RXLEV-SUB-SERVING-CELL | | | | | | OSTET 3
| O spare | colspan="3" | RXQUAL-FULL SERVING-CELL | | | colspan="3" | RXQUAL-SUB SERVING-CELL | | | NO-NCELL M (high part) | OSTET 4
| NO-NCELL-M (low part) | colspan="7" | RXLEV-NCELL 1 | | | | | | | OSTET 5
| colspan="5" | BCCH-FREQ-NCELL 1 | | | | | | colspan="3" | BSIC-NCELL 1 (high part) | | | OSTET 6
| colspan="3" | BSIC-NCELL 1 (low part) | | | colspan="5" | RXLEV-NCELL 2 (high part) | | | | | | OSTET 7
| RXLEV-NCELL 2 (Low part) | colspan="5" | BCCH-FREQ-NCELL 2 | | | | | | colspan="2" | BSIC-NCELL 2 (high part) | | | OSTET 8
| colspan="2" | BSIC-NCELL 2 (Low part) | | | colspan="6" | RXLEV-NCELL 3 (high part) | | | | | | | OSTET 9
| colspan="2" | RXLEV-NCELL 3 (Low part) | | | colspan="5" | BCCH-FREQ-NCELL 3 | | | | | | BSIC-NCELL 3 (high part) | OSTET 10
| colspan="3" | BSIC-NCELL 3 (Low part) | | | colspan="5" | RXLEV-NCELL 4 (high part) | | | | | | OSTET 11
| colspan="3" | RXLEV-NCELL 4 (Low part) | | | colspan="5" | BCCH-FREQ-NCELL 4 | | | | | | OSTET 12
| colspan="6" | BSIC-NCELL 4 | | | | | | colspan="2" | RXLEV-NCELL 5 (high part) | | | OSTET 13
| colspan="3" | RXLEV-NCELL 5 (Low part) | | | colspan="5" | BCCH-FREQ-NCELL 5 (high part) | | | | | | OSTET 14
| BCCH-FREQ-NCELL 5 (Low part) | colspan="6" | BSIC-NCELL 5 | | | | | | RXLEV-NCELL 6 (high part) | OSTET 15
| colspan="5" | RXLEV-NCELL 5 (Low part) | | | | | | colspan="3" | BCCH-FREQ-NCELL 5 (high part) | | | OSTET 16
| colspan="2" | BCCH-FREQ NCELL 6 (low part) | | | colspan="6" | BSIC-NCELL 6 | | | | | | | OSTET 17

FIG. 2 <u>PRIOR ART</u>

|        | Bit 8 | Bit 7 | Bit 6 | Bit 5 | Bit 4 | Bit 3 | Bit 2 | Bit 1 |
|--------|-------|-------|-------|-------|-------|-------|-------|-------|
| Byte 1 | ARFCN#1 (high part) | | | | | | | |
| Byte 2 | ARFCN#1 (low part) | | | ARFCN#2 (high part) | | | | |
| Byte 3 | ARFCN#2 (low part) | | | | | ARFCN#3 (high part) | | |
| ... | | | | | | | | |
| Byte X-1 | ARFCN#m-1 (low part) | | | ARFCN#m (high part) | | | | |
| Byte X | ARFCN#m (low part) | | | | | | Spare bit (0) | Spare bit (0) |

FIG.3 <u>PRIOR ART</u>

| Current SMS number (4-bit) | Total SMS number (4-bit) |

FIG. 4

| [Possible service-specific data] |
| Number of measurements |

FIG. 5

| Relative intensity of the neighbouring cell signal (5 bit) | ARFCN-BSIC cache index (3 bit) |
| ARFCN (bit 9,8,7..2) | |
| ARFCN (bit 1,0) | BSIC (6 bit) |
| Absolute intensity of the neighbouring cell signal | |

FIG. 7

| RXLEV-FULL-SERVING-CELL (6-bit) | Changed Tag (2-bit) |
|---|---|
| MCC High Byte | |
| MCC Low Byte | |
| MNC | |
| LAC High Byte | |
| LAC Low Byte | |
| Serving cell ID (High Byte) | |
| Serving cell ID (Low Byte) | |
| Number of monitored neighbouring cells | |

FIG. 6

METHOD OF TRANSMITTING CELLULAR TELEPHONE LOCATION DATA

CROSS REFERENCE TO RELATED APPLICATIONS

This application is a continuation of U.S. patent application Ser. No. 10/473,616 filed 29 Sep. 2003 as a national stage of PCT/EP02/03592 filed 30 Mar. 2002 and in turn based upon Italian national application TO2001A000296 of 30 Mar. 2001 under the International Convention.

FIELD OF THE INVENTION

This invention relates to personal communication systems, such as, for example, GSM operating standard communication systems, and specifically relates to a method for transmitting cellular mobile telephone location data.

BACKGROUND OF THE INVENTION

As is known, one of the possibilities offered by personal communication systems, such as the above-mentioned GSM system, is the provision of location-based services, i.e. services based on determination of the position of a mobile cellular telephone owner in an area served by one or more Base Transceiver Stations (BTS)

This is possible because modern GSM mobile equipment s capable of measuring Base Transceiver Stations in its own cell and neighboring cells, detecting, storing and transmitting the respective information.

This information comprises:
1. National code (Mobile Country Code=MCC) pertaining to the serving cell;
2. Network code (Mobile Network Code=MNC) pertaining to the serving cell;
3. Local area code (Local Area Code=LAC) pertaining to the serving cell;
4. Serving cell identification (Cell ID);
5. Control channel signal intensity of serving cell (RxLev);
6. Control channel signal intensity of neighboring cells detected by the telephone (RxLev);
7. Frequency indexes (BCCH-FREQ=Broad Control Channel-Frequency) univocally corresponding to channel numbers (ARFCN=Absolute Radio Frequency Channel Number) and identification codes (BSIC=Base transceiver Station Identity Code) related to neighboring cell base stations.

This information, consisting of numeric data, combined with the geographic positions of the Base Transceiver Stations, contained in a database generally provided by the mobile telephone operator, can be used by an appropriate calculation procedure to estimate the position of the GSM mobile equipment.

The described information is normally tracked by the mobile equipment via a SIM Toolkit type application, installed on the SIM card ("Subscriber Identity Module"), and compressed to be sent by means of SMS (Short Message System) messages to a remote Service Center.

Firstly, the received messages are decompressed and then fed into a processing system, called a "Location Engine," which, by applying an appropriate algorithm, computes the geographical position of the mobile equipment. If required, the system either informs the mobile equipment of its position or utilizes it for a location-based service.

The need to reduce the number of SMS messages transmitted for each location request arises during the data exchange phase between mobile equipment and Service Center. This is necessary to satisfy the needs of all mobile telephone operators, who cannot afford excessive traffic on their network for a single application, and of users, who require cost-effectiveness.

Additionally, reducing the number of transmitted SMS text messages means significantly reducing the response time of each location-based service, thus providing a significant contribution to service quality.

OBJECT OF THE INVENTION

It is the object of the invention to provide a cellular telephony mobile equipment location data transmission method which overcomes these shortcomings and solves the described technical problems by implementing a compressed format for GSN mobile equipment location data suitable to be sent in the form of an SMS message.

SUMMARY OF THE INVENTION

The invention is a method for transmitting cellular telephone mobile equipment location data in which an application, preferably installed on a SIM card contained in the mobile equipment, measures the Base Transceiver Stations in the serving cell and the neighboring cells, detecting, storing and transmitting respective information to a remote Service Center by means of SMS messages, where a processing system, applying an appropriate algorithm and a Base Transceiver Stations geographic position database, computes the geographical position of the mobile equipment and informs the mobile equipment of the geographical position.

The application preferably installed on the SIM card generates SMS messages containing location data in compressed format, comprising specific data of each single message, specific data on the message set, specific data on measurements and specific data on the serving cell and the neighboring cells monitored by the mobile equipment, the dimensions of some data depending on the results of the measurements made at the current instant and those obtained at an earlier time.

The location data in compressed format comprises:
for each message:
the current SMS message order number;
the total number of messages dedicated to location data transmission;
consequently, in the message body:
data dedicated to specific services, where relevant;
the number of the measurements;
for each measurement:
RXLEV-FULL-SERVING-CELL, i.e. the intensity of the serving cell signal;
"Changed Tag," i.e. the label indicating which of the four data—Cell ID (serving cell identification), LAC (Local Area Code), MCC (Mobile Country Code) and MNC (Mobile Network Code), pertaining to the serving cell—have changed with respect to the previous measurement;
MCC, if "Changed Tag" is higher than a first value;
MNC, if "Changed Tag" is higher than the first value;
LAC, if "Changed Tag" is higher than a second value;
Serving Cell ID, if "Changed Tag" is higher than a third value;
the number of monitored neighboring cells;
for each neighboring cell:
the relative intensity of the signal computed on the basis of the previous measurement;

"ARFCN-BSIC cache index," i.e. the index of the ARFCN-BSIC (channel order number-identification code) pair in an appropriate memory table;

ARFCN (channel order number), if "ARFCN-BSIC cache index" has a first binary value;

BSIC (identification code), if "ARFCN-BSIC cache index" has the first binary value; and absolute intensity of the signal, if the "neighboring cell relative signal intensity" has a second binary value.

The location data can have the following binary dimensions:

current SMS message order number, 4 bits;
total number of messages, 4 bits;
data dedicated to a specific service, 1 or more bytes;
measurement order number, 1 byte;
RXLEV-FULL-SERVICE-CELL, 6 bits;
"Changed Tag," 2 bits;
MCC, 2 bytes;
MNC, 1 byte;
LAC, 2 bytes;
serving Cell ID, 2 bytes;
number of monitored neighboring cells, 1 byte;
neighboring cell signal relative intensity, 5 bits;
"ARFCN-BSIC cache index," 3 bits;
ARFCN, 10 bits;
BSIC, 6 bits;
neighboring cell signal absolute intensity, 8 bits.

Whenever a new measurement is made, the application preferably installed on the SIM card checks which of the four data sets (Cell ID, LAC, MCC and MNC) have changed with respect to the previous measurement and consequently sets the Changed Tag value, adding only the data which have changed to the body of the SMS message.

In order to calculate the neighboring cell signal relative intensity, the application preferably installed on the SIM card uses a 1-byte memory table for each monitored neighboring cell and, during SMS coding, initializes a third binary value for each item in the table and carries out the following operations after each neighboring cell signal intensity measurement:

if the intensity of the current neighboring cell is included in a first binary range with respect to the intensity of the previous measurement related to the neighboring cell in the same position, the application only transmits the difference between the intensities and updates the table with the current intensity absolute value;

otherwise the second binary value is assigned to the relative intensity, the absolute current intensity value is sent in the subsequent byte and the table is updated with the same absolute value, a similar reversed procedure being carried out on Service Center side for decoding.

The application preferably installed on the SIM card uses a table formed by pairs of ARFCN-BSIC values which are filled progressively as new ARFCN-BSIC pair values are encountered to obtain the "ARFCN-BSIC cache index," and if a value present in the table is encountered, the ARFCN-BSIC pair line order number or index containing the encountered value is used instead of the value itself;

if an ARFCN-BSIC value which is not present in the table is encountered and the table is full, the new value will be written over the oldest, according to FIFO mode, while, if the table is not fill, "ARFCN-BSIC cache index" is set to the first binary value and the real value is added in the subsequent bytes, whereby adding the new value in the table, a similar reversed procedure being carried out on the Service Center side for decoding.

BRIEF DESCRIPTION OF THE DRAWING

Additional characteristics and advantages of the invention will now be described by way of example only, with reference to the accompanying drawing in which:

FIG. 1 is a diagram of the network and serving cell data format according to GSM standard;

FIG. 2 is a diagram of the signal intensity of all monitored cells, frequencies and identification codes of neighboring cells;

FIG. 3 is a diagram of the channel number format of the neighboring cell links;

FIG. 4 is a diagram of the first byte in the message according to the invention;

FIG. 5 is a diagram of the service data and measurement number format, where relevant;

FIG. 6 is a diagram of the data format of each measurement; and

FIG. 7 is a diagram of the data format of each neighboring cell.

SPECIFIC DESCRIPTION

The Base Transceiver Stations data format measured by the mobile equipment and supplied to its SIM card is described in GSM specifications and essentially concerns three different types of data:

Data on the network and serving cell currently in use, indicated as MCC, MNC, LAC and Cell ID in the description above. Numeric representation is illustrated in FIG. 1.

Data on signal intensity in monitored cells, frequency index and neighboring cell identification codes, indicated as RxLev, BCCH-FREQ and BSIC in the description above. Numeric representation, defined in GSM 04.08 specifications, is illustrated in FIG. 2.

List of neighboring cell link channel number, indicated as ARFCN in the description above. Numeric representation, defined in GSM 11.14, specifications, is illustrated in FIG. 3.

As shown in FIG. 1, MCC, LAC and Cell ID are each represented by two bytes, High Byte and Low Byte, while MNC only requires one.

FIG. 2 shows data on signal intensity, frequencies, codes, etc., pertaining to neighboring cells, distributed on 17 octets (or bytes), for up to eight monitored cells.

Specifically, the fields have the following meaning in GSM context:

Measurement Results IEI (7 bits): identifier of the information that follows (IEI=Information Element Identifier), i.e. measurement results in this case;

BA-USED (1 bit): BCCH coding type;

DTX-USED (1 bit): indicating whether the mobile equipment uses DTX (DTX=Discontinuous transmission [mechanism]) or not, i.e. a power level transmission which is not continuous in the previous measurement period;

RXLEV-FULL-SERVING-CELL (6 bits): intensity of the signal received from the serving cell, measured on all slots;

MEAS-VALID (1 bit): indicating validity of measurements on the dedicated channel;

RXLEV-SUB-SERVING-CELL (6 bits): intensity of the signal received from the serving cell, measured on a subset of slots;

RXQUAL-FULL-SERVING-CELL (3 bits): quality of the signal received from the serving cell measured on all slots;

RXQUAL-SUB-SERVING-CELL (3 bits): quality of the signal received from the serving cell measured on a subset of slots;

NO-NCELL-M (3 bits): number of measurements of neighboring cells;

RXLEV-NCELL I (6 bits): intensity of signal received from the i-th neighboring cell (I =1 . . . 6);

BCCH-FREQ-NCELL I (5 bits): frequency index related to the BCCH channel of the i-th neighboring cell;

BSIC-NCELL I (6 bits): identification code of the i-th neighboring cell base station.

FIG. 3 illustrates the link frequency format, identified as the absolute number of the m—the radio-frequency channel (ARFCN#m). Each is formed by ten consecutive bits, subdivided into "high part" and "low part," and identified by the frequency index BCCH-FREQ-NCELL I.

Sending all this information in standard GSM format would be rather costly in terms of the number of SMS messages required. This is because the mobile equipment must provide a certain number of consecutive measurements for sufficiently accurate and reliable location to filter detected signal frequency peaks (positive and negative).

According to the invention, the transmission of location data detected by the GSM equipment is made using a compressed format which requires a much reduced number of SMS messages. Naturally the number of SMS messages will be affected, since accuracy and reliability of location depends on the number of measurements made.

Generation of the format must be as simple as possible because it is processed by a SIM card application and, as known, the SIM card performance and computing capacity are poor if compared to those of a personal computer. Furthermore, a complex application would occupy a great deal of memory space, consequently penalizing optional location-based services, which are interesting from a commercial point of view.

The application installed on the SIM card generates SMS messages containing location data in compressed format, comprising specific data on each single message, specific data on the message set, specific data on measurements and specific data on the serving cell and the neighboring cells monitored by the mobile equipment. The dimensions of some data depend on the results of the measurements made at the current instant and those obtained at an earlier time.

The format description refers to FIGS. 4, 5, 6 and 7 which illustrates tables in which each line corresponds to a byte in the SMS message.

Considering that the above-mentioned information can occupy more than one SMS message, the first byte of each message must contain the data shown in FIG. 4, i.e. the current SMS message number and the total number of messages dedicated to location data transmission.

The subsequent bytes in the body of the message contain information described in FIG. 5. Specifically, some bytes are dedicated to "possible service-specific data," i.e. data dedicated to a specific service. This is because the mobile equipment location process could be linked to high number of location-based services installed on the user's SIM card. In these cases, numerous other data may need to be communicated to the Service Center. For example, transmission may include the selection the user made in a telephone menu (SAT application). Such data must be included in the transmitted SMS messages and integrated with pure location information.

An additional byte is used to indicate the number of measurements.

FIG. 6 lists the data transmitted for each measurements, particularly:

RXLEV-FULL-SERVING-CELL (6 bits), i.e. the intensity of the serving cell signal;

"Changed Tag" (2 bits), whose meaning is explained below;

MCC (2 bytes, High byte and Low byte), present if the "Changed Tag" is higher than 2;

MNC (1 byte), present if "Changed Tag" is higher than 2;

LAC (2 bytes, High byte and Low byte), present if "Changed Tag" is higher than 1;

Serving Cell ID (2 bytes, High byte and Low byte), present if "Changed Tag" is higher than 0;

the number of monitored neighboring cells (1 byte).

"Changed Tag" is useful when several consecutive measurements are required by the mobile equipment. This condition is necessary to obtain reliable locations. "Changed Tag" indicates which of the four cell data (Cell ID, LAC, MCC or MNC), related to the serving cell, have changed with respect to the previous measurement. When a new measurement is made, the procedure checks what has changed with respect to the previous data stored by the SIM card and sets the Changed Tag value consequently. Finally, only the data which have changed are added to the SMS message body.

The data listed in FIG. 7 are measured and transmitted for each neighboring cell, specifically:

the relative intensity of the neighboring cell signal (5 bits), computed on the previous measurements as explained below;

"ARFCN-BSIC cache index" (3 bits), whose meaning will be explained below;

ARFCN (10 bits), subdivided into two parts, one consisting of one byte and one by two bits. Present if "ARFCN-BSIC cache index" has binary value "111";

BSIC (6 bits), also present if "ARFCN-BSIC cache index" has binary value "111"; and absolute intensity of neighboring cell signal (8 bits), present if the relative intensity of the neighboring cell has binary value "11111."

The application residing on the SIM card uses a 6-byte memory table to compute the relative intensity of the neighboring cell signal, one for each monitored neighboring cell. During SMS message coding, each element of the table is initialized to binary value "11110." Subsequently, the following operations are carried out each time the neighboring cell signal is detected:

if the intensity of the current neighboring cell is included in the binary range ±"01111" with respect to the intensity of the previous measurement related to the neighboring cell in the same position, only the difference in intensity is transmitted (therefore only 5 bits in the SMS message are required) and the table is updated with the absolute value of the current intensity;

otherwise the binary value "11111" is assigned to the relative intensity, the absolute current intensity value is sent in the subsequent byte and the table is updated with the same absolute value.

A similar reversed procedure is carried out on Service Center side for decoding.

"ARFCN-BSIC cache index" is the index of the ARFCN-BSIC pair in a specific memory table (cache). The pair is used to determine the Cell ID which univocally identifies the neighboring cell.

It is very likely for the set of monitored neighboring cells to change significantly during multiple consecutive measurements required for correct location. Consequently, a specific table is used to reduce the space required to store the ARFCN-BSIC pairs related to monitored neighboring cells. This table has a capacity of seven value pairs and is filled progressively as new ARFCN-BSIC pair values are found.

If a value present in the table is encountered, the row number, or index, containing the encountered value is used instead of the value itself. A considerable amount of space is saved since the index only occupies 3 bits, while the ARFCN-BSIC pair occupies 16 bits.

If an ARFCN-BSIC value which is not present in the table is encountered and the table is full, the new value will be written over the oldest, according to FIFO mode. This mechanism ensures high simplicity in management and good efficiency.

"ARFCN-BSIC cache index" is set to binary "111" and the real value is added in the subsequent bytes as shown in the format specifications when an ARFCN-BSIC pair value which is not present in the table is encountered. The new value is thus added to the table.

A similar reversed procedure is carried out on Service Center side for decoding.

Naturally, numerous changes can be implemented to the construction and embodiments of the invention herein envisaged without departing from the scope of the present invention, as defined by the following claims.

I claim:

1. A method for cellular telephony mobile equipment location-based services data transmission in which an application carries out measures on Base Transceiver Stations or associated cells by detecting, storing and transmitting respective information to a remote Service Center by means of messages, where a processing system, applying calculation procedures and a Base Transceiver Stations geographic position database, computes data associated with the location-based services, the method comprising the steps of:
    generating in the application at least one message containing a set of data in compressed format, the set of data being selected from a set comprising specific data on each single message, specific data on the message set, specific data on measurements and specific data on the cells monitored by the mobile equipment wherein the dimensions of the specific data on the measurements generated in compressed format depend on results of the measurements made at a current instant and those obtained at an earlier time,
    wherein the data in compressed format comprise, for each measurement:
        data representing an intensity of a signal of the serving cell associated with the mobile equipment;
        a label indicating which data pertaining to the serving cell, among a serving cell identifier, a local area code, a mobile country code and a mobile network code, have changed with respect to a previous measurement; and
        a number of monitored neighboring cells associated with the mobile equipment,
    wherein whenever a new measurement is made, the application checks which data of the serving cell, among the serving cell identifier, the local area code, the mobile country code and the mobile network code, have changed with respect to the previous measurement and consequently sets the label, adding only the corresponding data which have changed to the body of the message.

2. The method according to claim 1, further comprising the steps of
    checking what data have changed in the results obtained at a current instant with respect to the results obtained at an earlier time, and
    adding to the message only the data that have changed.

3. The method according to claim 1 wherein the data in compressed format comprise for each message:
    a current message order number; and
    a total number of messages dedicated to location-based services data transmission.

4. The method according to claim 1 wherein the data in compressed format comprise, in the message body:
    data dedicated to specific services; and/or a number of the measurements.

5. The method according to claim 1 wherein the data in compressed format comprise, for each measurement:
    the mobile country code and the mobile network code, if the label is higher than a first value;
    the local area code, if the label is higher than a second value; and
    the serving cell identifier, if the label is higher than a third value.

6. The method according to claim 1 wherein the data in compressed format comprise, for each neighboring cell:
    a relative intensity of the signal computed on the basis of a previous measurement;
    a cache index of a channel order number-identification code pair in a memory table;
    the channel order number and the identification code, if the cache index has a first binary value; and
    an absolute intensity of the signal, if the relative signal intensity has a second binary value.

7. The method according to claim 1 wherein the at least one message containing a set of data in compressed format is an SMS-type message.

8. The method according to claim 1 wherein the application is installed on the mobile equipment or on a SIM card contained in the mobile equipment.

9. The method according to claim 1 wherein the processing system informs the mobile equipment of the geographic position, if required.

10. The method according to claim 1 wherein the data in compressed format comprise service-specific data dedicated to a specific service.

* * * * *